United States Patent [19]

Foulkes

[11] 3,757,056

[45] Sept. 4, 1973

[54] BIPOLAR MULTIPLEXING CIRCUIT FOR TELEPHONE LINE SELECTION

[75] Inventor: John D. Foulkes, Lexington, Mass.

[73] Assignee: Telecommunication Engineering Corporation, Burlington, Mass.

[22] Filed: Mar. 16, 1972

[21] Appl. No.: 235,236

[52] U.S. Cl. .......... 179/99, 179/18 AA, 179/18 BB, 179/37

[51] Int. Cl. .......... H04q 3/00

[58] Field of Search .......... 179/37, 40, 1 H, 179/18 AA, 16 A, 86, 18 BB, 99

[56] References Cited

UNITED STATES PATENTS

| | | | |
|---|---|---|---|
| 3,487,171 | 12/1969 | Schuberth | 179/18 BB |
| 2,400,148 | 5/1946 | Hubbard | 179/18 BB X |
| 3,328,533 | 6/1967 | Vaccaro et al. | 179/18 BB |
| 3,319,010 | 5/1967 | Franchi et al. | 179/86 X |

*Primary Examiner*—Thomas W. Brown
*Attorney*—Herbert W. Kenway, Jeremiah Lynch et al.

[57] ABSTRACT

A telephone is selectively connectable with any one of a plurality of central office lines through tree-connected relay circuits located in a remote control box. Line selection switches located at the telephone operate the relay circuits over control leads, each lead being adapted for two functions by a pair of branch circuits with rectifiers connected to the lead at each end.

2 Claims, 2 Drawing Figures

PATENTED SEP 4 1973

3,757,056

BIPOLAR MULTIPLEXING CIRCUIT FOR TELEPHONE LINE SELECTION

BRIEF SUMMARY OF THE INVENTION

This invention relates generally to circuits for selective connection of a telephone to one of a plurality of lines, and more particularly it relates to circuits adapted to minimize the number of wires required for connecting an individual telephone.

A conventional way of connecting a telephone with a plurality of line pairs from the central office is to run all of the pairs to the telephone, and to perform the selective switching at the telephone set. In cases where the number of available central office pairs is relatively large, this requires each telephone to be connected through a correspondingly large cable.

It is a principal object of this invention to reduce the size of the cable required for telephones having plural line selection push-buttons, switches or keys, and to provide attendant simplifications in the control circuits.

Another and related object is to provide controls for functions in addition to line selection, operable selectively by switches at the telephone and utilizing the same leads employed for line selection.

With the foregoing and other related objects in view, the features of this invention include the provision of a control box in the installation in which one or more telephones are located, this box containing the terminals for a plurality of incoming lines from the central office. Each telephone is connected to the control box by a single talking pair and a plurality of control leads connected with its line selector and control function selector switches. Within the control box, the talking pair has connection with the incoming lines through tree-connected contacts operated by a plurality of relays. The relays are selectively energized by the control leads from the telephone. An important feature of this invention resides in the provision of current direction discriminating elements, such as rectifiers, to cause each control lead to be dual-purpose in operation. Thus there are two line selection or control elements within the control box respectively connected with a single control lead through two branch circuits having oppositely directed current direction discriminators, and there are two switches at the telephone connected with the same control lead, these switches also being respectively connected through two branch circuits having oppositely directed current direction discriminating elements, whereby upon the application of an alternating current one of the switches may operate one of the elements in the control box and the other switch may operate the other element.

The two elements per control lead thus operated remotely by switches at the telephone may both comprise relays operative upon the tree-connected contacts, or one element may comprise such a relay and the other element may comprise any one of a wide variety of available circuit controls, to perform functions such as "hold" and "exclusion."

Other features of the invention reside in circuits, elements and connections thereof that will be more readily understood by reference to the following description.

DETAILED DESCRIPTION

Figure 1:
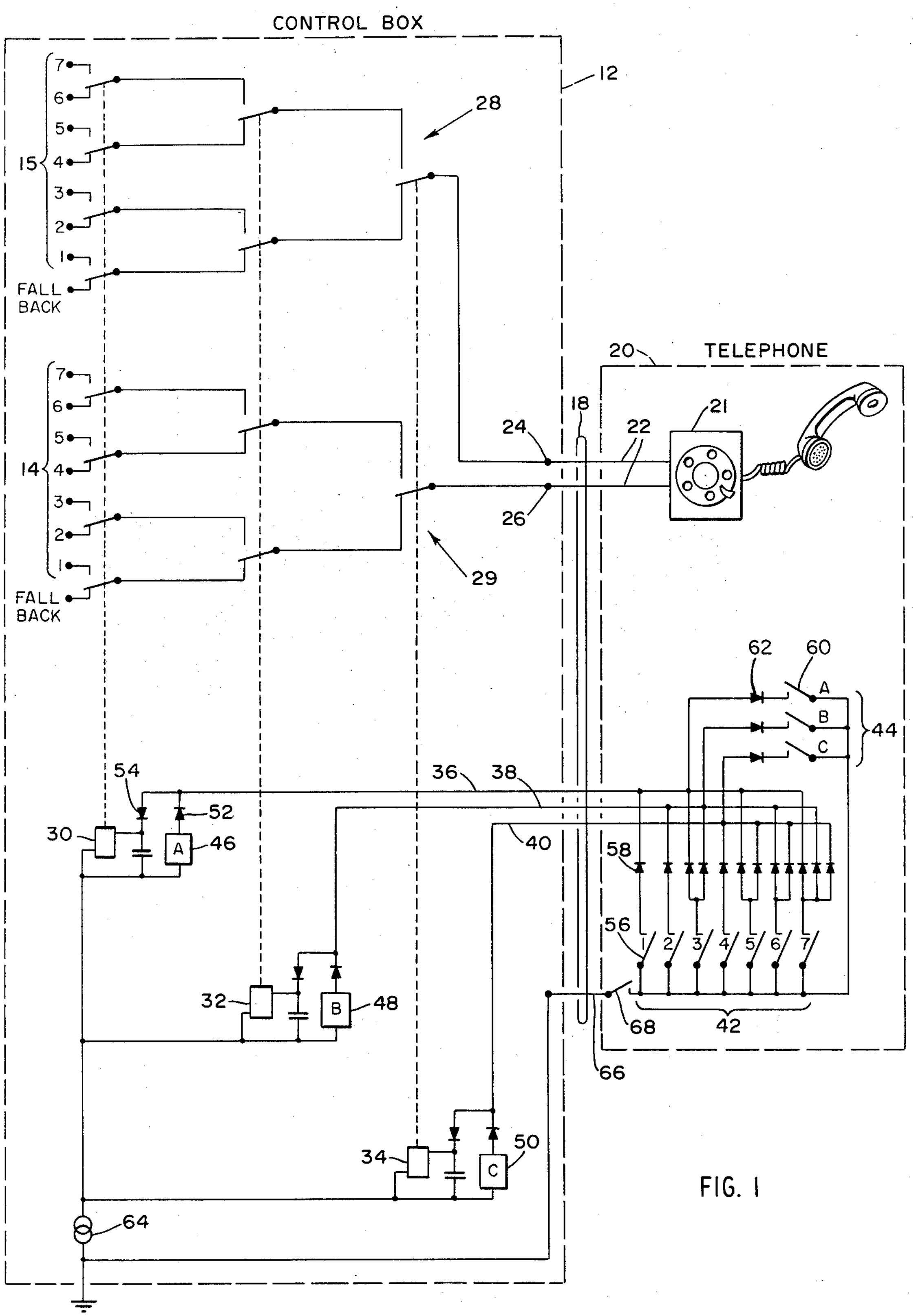
FIG. 1 is a simplified circuit diagram of a preferred embodiment of the invention adapted for both line selection and function selection.

Referring to FIG. 1, there is provided a control box 12 having a plurality of ring terminals 14 and a plurality of tip terminals 15 for connection to incoming lines from a central office. Each pair of incoming lines has its two wires respectively connected to like-numbered ring and tip terminals. A cable 18 connects the control box with a telephone 20 having a conventional handset 21, which is ordinarily in the same building or facility as the control box but remote therefrom. The cable 18 contains a single talking pair 22 connected with tip and ring terminals 24 and 26. Each of these terminals is connected with the line terminals 15 or 14 through a conventional fanning-out contact tree designated generally at 28 and 29, respectively. Control relays 30, 32 and 34 for the trees are energized by control leads 36, 38 and 40, respectively, to connect the terminals 24 and 26 with any selected incoming lines.

Selection of the incoming line is accomplished by a plurality of push-button line selection switches 42 in the telephone set. In addition to the line selection switches 42 there are a plurality of function selection switches 44.

The control box also contains a plurality of function control circuits, respectively designated 46, 48 and 50. Each of these circuits may take any desired and presently known form adapted to perform a recognized control function in the telephone system. Typical control functions include the "hold" feature and the "exclusion" feature, the latter of which denies to all other telephones in the system access to the selected line. However, these two examples are only mentioned for illustration, and it will be evident that the generality of the invention is not limited thereto.

It will be noted that each of the control circuits 46, 48 and 50 is associated with one of the line selection relays 30, 32 and 34, having one common connection and a second connection to a common control lead 36, 38 or 40. However, each of the control circuits is connected with its control lead through a current direction discriminating element directed oppositely to a similar element connecting the associated relay with the same control lead. For example, a silicon rectifier 52 is connected with the control lead 36 in one polarity, while a silicon rectifier 54 is connected with the lead 36 in the opposite polarity.

The selection switches 42 and 44 in the telephone are also connected with the control leads 36, 38 and 40 through current direction discriminating elements. For example, a pushbutton switch 56 suitably marked for selection of an incoming line marked 1 is connected with the lead 36 through a silicon rectifier 58 having the same direction as the rectifier 54; whereas, a function control switch 60 is connected with the control lead 36 through a silicon rectifier 62 having the same direction as the rectifier 52.

Circuits for energizing the relays and function control circuits through the line selector switches 42 and function selection switches 44 are energized by an alternating current source 64 located in the control box, the source 64 being connected to a common ground return line 66 in the cable 18. Taking the examples previously given, if the telephone is removed from its hook, closing a telephone hook switch 68 in the ground return line, subsequent closure of the line selector switch 56 for line 1 will energize the relay 30, connecting the tip and ring terminals 24 and 26 with a central office line 1. If only the switch 56 is closed, the control circuit 46 will not be energized because of the opposed polarities of the rectifiers 52 and 58. However, if the switch 60 is closed either alone or simultaneously with the switch 56, the circuit 46 will be energized.

In the above-described circuit, the rectifiers associated with the telephone line and function selector switches are connected in a manner adapted to close the appropriate contacts of the trees 28 and 29 as well as to operate such control circuits 46, 48 and 50 as are selected by the telephone user. It will be noted that by means of the foregoing circuit, the same control lines 36, 38 and 40 serve both for line selection and for function selection.

Figure 2:
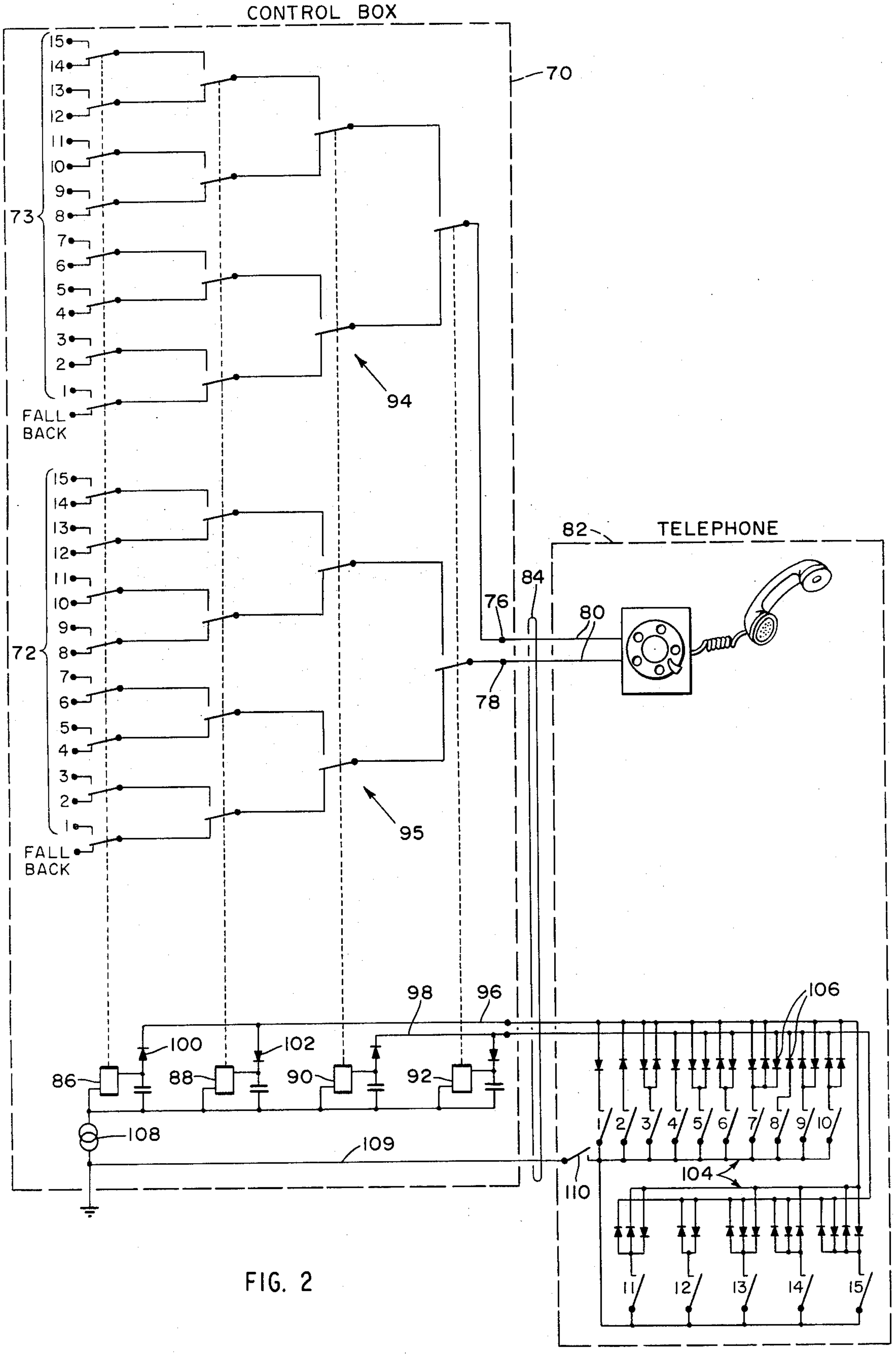
FIG. 2 is a circuit diagram of an alternative embodiment adapted solely for line selection.

FIG. 2 illustrates another embodiment of the invention which includes the two function feature disclosed in FIG. 1, but wherein both of the elements energized through a single common control lead are relays for controlling the line selector contact trees. A control box 70 has terminals 72 and 73 for connection with a plurality of incoming lines from the central office, as in FIG. 1. A tip terminal 76 and a ring terminal 78 are connected with a talking pair 80 extending to a telephone 82 through a cable 84. The control box contains relays 86, 88, 90 and 92 for controlling the contacts of trees 94 and 95. The four relays are connected in pairs with two control leads 96 and 98 extending through the cable 84. As in the case of FIG. 1, the two elements connected with each control lead have oppositely directed current direction discriminator elements. For example, the relay 86 has a connection in one direction through a silicon rectifier 100 to the control lead 96, whereas the relay 88 has a silicon rectifier 102 connected oppositely to the same control lead 96.

Line selection switches designated generally at 104 are similar to the switches 42 in FIG. 1, having rectifiers such as 106 connected in appropriate combinations to the control leads 96 and 98 to energize corresponding relays in the control box. In this embodiment some of the rectifiers 106 are connected with one polarity and others are connected with the opposite polarity, depending upon the polarities of the relays with which they are associated. An alternating current source 108 is connected in the same manner as for FIG. 1, through a ground return line 109 and a telephone hook switch 110, for energizing the relays through the line selector switches.

It will be seen that by use of the foregoing circuits, any one of a large number of lines from the central office can be selectively connected to a telephone by appropriate switching at the telephone, with a relatively small number of leads in the connecting cable 84. In general, with $n$ control leads in the cable it is possible to select from as many lines as 2 raised to the power $2n$, less 1 for the usual fall-back position with no relays energized.

Although this invention has been described with reference to only two embodiments, it will be recognized that these embodiments are only illustrative, and other arrangements, modifications and adaptations of the circuits may be made without departing from the spirit or scope of this invention.

I claim:

1. Telephone line selection means including, in combination, a control unit having connections for a plurality of external line pairs, a ring terminal, a tip terminal, selector means including a plurality of relays and tree-connected contacts actuated by the relays, said contacts being adapted to cause a selected external line pair to be connected with the tip and ring terminals upon energization of a predetermined combination of the relays, and an energizing circuit electrically isolated from the external line pairs and tree-connected contacts and including connections to a source of alternating current, a common lead, a control lead, and a first pair of parallel circuits each including a current direction discriminator and one of said relays and completing a connection between the common lead and the control lead through the source, the current direction discriminators being oppositely directed in said parallel circuits, and a telephone connected to the control unit by a cable, said cable including a talking pair connected with said ring and tip terminals and said common and control leads, said telephone including means electrically isolated from said talking pair and including a pair of independently operable line selection contacts and a second pair of parallel circuits each including a current direction discriminator and one of said line selection contacts and completing a connection between the common lead and the control lead, the current direction discriminators in the second pair of parallel circuits being oppositely directed.

2. Telephone line selection means including, in combination, a control unit having connections for a plurality of external line pairs, a ring terminal, a tip terminal, selector means including a plurality of relays and tree-connected contacts actuated by the relays, said contacts being adapted to cause a selected external line pair to be connected with the tip and ring terminals upon energization of a predetermined combination of the relays, and an energizing circuit electrically isolated from the external line pairs and tree-connected contacts and including connections to a source of alternating current, a common lead, a control lead, and a first pair of parallel circuits each including a current direction discriminator and at least one of which includes one of said relays, each of said parallel circuits completing a connection between the common lead and the control lead through the source, the current direction discriminators being oppositely directed in said parallel circuits, and a telephone connected to the control unit by a cable, said cable including a talking pair connected with said ring and tip terminals and said common and control leads, said telephone including means electrically isolated from said talking pair and including a pair of independently operable selection contacts and a second pair of parallel circuits each including a current direction discriminator and one of said selection contacts and completing a connection between the common lead and the control lead, the current direction discriminators in the second pair of parallel circuits being oppositely directed.

* * * * *